(12) United States Patent
Jeong

(10) Patent No.: US 12,059,943 B2
(45) Date of Patent: Aug. 13, 2024

(54) HEAT PUMP SYSTEM FOR VEHICLE

(71) Applicants: Hyundai Motor Company, Seoul (KR); Kia Corporation, Seoul (KR)

(72) Inventor: Seong-Bin Jeong, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 246 days.

(21) Appl. No.: 17/879,997

(22) Filed: Aug. 3, 2022

(65) Prior Publication Data
US 2023/0173881 A1 Jun. 8, 2023

(30) Foreign Application Priority Data

Dec. 8, 2021 (KR) .................. 10-2021-0174827

(51) Int. Cl.
*B60H 1/00* (2006.01)

(52) U.S. Cl.
CPC ..... *B60H 1/00885* (2013.01); *B60H 1/00278* (2013.01); *B60H 1/00785* (2013.01)

(58) Field of Classification Search
CPC .......... B60H 1/00885; B60H 1/00278; B60H 1/00785; B60H 1/00485; B60H 1/00899; B60H 1/32284; B60H 1/3227; B60H 1/00392; B60H 1/004; B60H 1/323; B60H 1/00385; B60H 1/143; B60H 2001/00307; B60H 2001/00928; B60L 58/26; B60L 58/27; F01P 7/14; B60Y 2304/01; B60Y 2304/03; B60Y 2304/05; B60Y 2306/09

See application file for complete search history.

(56) References Cited

U.S. PATENT DOCUMENTS

| | | | |
|---|---|---|---|
| 8,336,319 B2 * | 12/2012 | Johnston | B60K 11/04 62/434 |
| 9,758,010 B2 * | 9/2017 | Johnston | B60H 1/00385 |
| 10,099,531 B2 * | 10/2018 | Labaste Mauhe | B60H 1/321 |
| 2012/0178615 A1 * | 7/2012 | Corma | B01J 37/06 502/64 |
| 2012/0222441 A1 * | 9/2012 | Sawada | B60H 1/00907 62/238.1 |
| 2019/0176572 A1 * | 6/2019 | Kim | B60H 1/00428 |
| 2021/0001686 A1 * | 1/2021 | Kim | B60H 1/00921 |
| 2021/0053412 A1 * | 2/2021 | Kim | B60H 1/3222 |
| 2021/0061067 A1 * | 3/2021 | Kim | B60H 1/00921 |
| 2021/0138867 A1 * | 5/2021 | Kim | B60H 3/024 |

FOREIGN PATENT DOCUMENTS

| | | | | |
|---|---|---|---|---|
| DE | 102020106948 A1 * | 3/2021 | ......... | B60H 1/00278 |
| KR | 20210070065 A * | 6/2021 | ............. | B60H 1/143 |
| KR | 20210070066 A * | 6/2021 | ............. | B60H 1/143 |

* cited by examiner

*Primary Examiner* — Emmanuel E Duke
(74) *Attorney, Agent, or Firm* — MORGAN, LEWIS & BOCKIUS LLP

(57) ABSTRACT

A heat pump system for a vehicle regulates a temperature of a battery module by use of one chiller in which a coolant and a refrigerant exchange heat, and recovers various heat sources in a heating mode of the vehicle and utilizes the recovered heat sources for indoor heating to improve heating efficiency, and may include a first valve that controls a flow of a coolant introduced into an internal, an electrical component cooling device, a battery cooling device, an indoor heating device, an indoor cooling device, a centralized energy device, and a chiller, in which the first valve may include at least one port through which the coolant is introduced or discharged.

19 Claims, 4 Drawing Sheets

100

100

100

HEAT PUMP SYSTEM FOR VEHICLE

CROSS-REFERENCE TO RELATED APPLICATION

The present application claims priority to Korean Patent Application No. 10-2021-0174827 filed on Dec. 8, 2021, the entire contents of which is incorporated herein for all purposes by this reference.

BACKGROUND OF THE PRESENT DISCLOSURE

Field of the Present Disclosure

The present disclosure relates to a heat pump system for a vehicle. More particularly, the present disclosure relates to a heat pump system for a vehicle by selectively using a chiller in which a refrigerant and a coolant exchange heat with each other to regulate a temperature of a battery module, and selectively using a high-temperature coolant and a low-temperature coolant, respectively, to cool or heat an interior of the vehicle.

Description of Related Art

Generally, an air conditioning system for a vehicle includes an air conditioner unit circulating a refrigerant to heat or cool an interior of the vehicle.

The air conditioner unit, which is to maintain the interior of the vehicle at an appropriate temperature regardless of a change in an external temperature to maintain a comfortable internal environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Meanwhile, recently, in accordance with a continuous increase in an interest in energy efficiency and an environmental pollution problem, the development of an environment-friendly vehicle capable of substantially substituting for an internal combustion engine vehicle, and the environment-friendly vehicle is classified into an electric vehicle driven using a fuel cell or electricity as a power source and a hybrid vehicle driven using an engine and a battery.

In the electric vehicle or the hybrid vehicle among these environment-friendly vehicles, a separate heater is not used unlike an air conditioner of a general vehicle, and an air conditioner used in the environment-friendly vehicle is generally known as a heat pump system.

Meanwhile, the electric vehicle generates driving force by converting chemical reaction energy between oxygen and hydrogen into electrical energy. In the present process, thermal energy is generated by a chemical reaction in a fuel cell. Therefore, it is necessary in securing performance of the fuel cell to effectively remove generated heat.

Furthermore, the hybrid vehicle generates driving force by driving a motor using electricity supplied from the fuel cell described above or an electrical battery, together with an engine operated by a general fuel. Therefore, heat generated from the fuel cell or the battery and the motor may be effectively removed to secure performance of the motor.

Therefore, in the hybrid vehicle or the electric vehicle according to the related art, cooling means, a heat pump system, and a battery cooling system, respectively, may be configured as separate closed circuits to prevent heat generation in the motor, an electrical component, and the battery including a fuel cell.

Therefore, a size and a weight of a cooling module provided at the front of the vehicle are increased, and a layout of connection pipes supplying a refrigerant and a coolant to each of the heat pump system, the cooling means, and the battery cooling system in an engine compartment becomes complicated.

Furthermore, because the battery cooling system warming up or cooling the battery according to a state of the vehicle is separately provided so that the battery exhibits optimal performance, a plurality of valves for connecting the respective connection pipes to each other are used, and noise and vibrations due to frequency opening or closing operation of these valves are transferred to the interior of the vehicle so that a ride comfort deteriorates.

Furthermore, when heating the interior of the vehicle, there are disadvantages of decreasing heating performance due to a lack of a heat source, increasing electricity consumption due to the use of an electric heater, increasing power consumption of the compressor, and the like.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a heat pump system for a vehicle configured for improving heating efficiency by use of one chiller in which a coolant and a refrigerant exchange heat with each other to regulate a temperature of a battery module, and by recovering various heat sources in a heating mode of the vehicle and using the recovered heat sources for indoor heating.

Various aspects of the present disclosure are directed to providing a heat pump system for a vehicle, including: a first valve that is configured to control a flow of a coolant introduced into an interior; an electrical component cooling device that includes a first line connected to the first valve, and a radiator and a first pump provided on the first line, and is configured to circulate the coolant on the first line to cool at least one electrical component provided on the first line; a battery cooling device that includes a second line connected to the first valve, and a second pump and a battery module provided on the second line, and circulates the coolant to the battery module; an indoor heating device that includes a third line connected to the first valve to heat an interior of the vehicle using a high-temperature coolant, and a third pump and a heater interconnected through the third line; an indoor cooling device that includes a fourth pump and a cooler interconnected through a fourth line to cool the interior of the vehicle using a low-temperature coolant; a centralized energy (CE) device that regulates a temperature of the coolant by exchanging heat between thermal energy generated during condensation and evaporation of a refrigerant circulated on a refrigerant line and the introduced coolant to supply the high-temperature coolant to the indoor heating device and supply the low-temperature coolant to the indoor cooling device; and a chiller which is connected to the centralized energy device through a refrigerant connection line so that the refrigerant is selectively circulated, and is provided on a fifth line connected to the first line and the second line through the first valve or a second valve, and selectively heat-exchanges the introduced coolant with the refrigerant to regulate the temperature of the coolant, in which the first valve may include at least one port through which the coolant is introduced or discharged.

The at least one port may include: a first port to which a first end portion of the first line connected to the at least one electrical component is connected; a second port to which a first end portion of a sixth line is connected to supply a coolant to a condenser provided in the centralized energy device; a third port to which a first end portion of the third line is connected; a fourth port to which a first end portion of the second line is connected; and a fifth port to which a first end portion of the fifth line is connected.

A second end portion of the first line may be connected to the second valve, a second end portion of the second line may be connected to the second valve, a second end portion of the third line may be selectively connectable through a third valve provided on the sixth line, and the sixth line may be connected to a radiator connection line through the third valve to be selectively connectable to the radiator by operation of the third valve.

A first end portion of the radiator connection line may be connected to the third valve, and a second end portion of the radiator connection line may be connected to the radiator.

The heat pump system may further include: a supply line that has a first end portion connected to the third line and a second end portion connected to the battery module; and a bypass line that has a first end portion connected to the second valve and a second end portion connected to the first line between the radiator and the first pump so that the coolant is circulated to the at least one electronic device without passing through the radiator.

When cooling the battery module in a cooling mode of the vehicle, in the electrical component cooling device, the coolant may be circulated on the first line by operation of the first pump, the first line and the sixth line may be connected by operation of the first valve, a portion of the first line connecting the radiator and the second valve and the bypass line may be closed by operation of the second valve, the sixth line and the radiator connection line may be connected by operation of the third valve, the third line and the supply line may be closed by operation of the third valve, the coolant flowing along the first line may be introduced into the first port, and then may be discharged to the sixth line through the second port and supplied to the condenser, the coolant passing through the condenser may be introduced into the radiator through the opened radiator connection line, in the electrical component cooling device, the coolant may be circulated to the radiator, the at least one electrical component, and the condenser along the opened first line, first valve, sixth line, and radiator connection line, in the battery cooling device, the second pump may operate, the second line and the fifth line may be opened by operation of the first valve, the second line and the fifth line may be connected by operation of the second valve, the coolant flowing along the second line may be introduced into the fourth port, and then may be discharged to the fifth line through the fifth port and supplied to the chiller, the coolant passing through the chiller may be introduced into the battery module along the second line connected through the second valve, in the battery cooling device, the coolant may be circulated to the battery module and the chiller along the second line, the first valve, and the fifth line, in the centralized energy device, each component may operate to circulate the refrigerant along the refrigerant line, and in the indoor cooling device, the fourth pump may operate so that the coolant is circulated along the fourth line connecting the evaporator and the cooler to supply the coolant passing through the evaporator provided in the centralized energy device to the cooler.

When recovering an external heat source and increasing the temperature of the battery module in a heating mode of the vehicle, in the electrical component cooling device and the battery cooling device, the first and second pumps may operate, respectively, the third pump may operate in the indoor heating device, the first line and the fifth line may be connected by operation of the first valve, a portion of the first line connecting the radiator and the second valve may be opened by operation of the second valve, the bypass line may be closed by operation of the second valve, the coolant flowing along the first line may be introduced into the first port, and then may be discharged to the fifth line through the fifth port and supplied to the chiller, the coolant passing through the chiller may be introduced into the radiator along the opened first line, in the electrical component cooling device, the coolant passing through the at least one electrical component may pass through the chiller along the first line, the first valve, and the fifth line, and then recover a heat source from an outside air while passing through the radiator along the opened first line, a portion of the second line connecting the battery module and the second valve may be closed by operation of the second valve, the second line may be connected to the sixth line by operation of the first valve, in a state in which the radiator connection line is closed by operation of the third valve, the third line may be opened, the supply line may be connected to the battery module, the coolant passing through the battery module may be introduced into the fourth port along the second line, and then discharged to the sixth line through the second port and supplied to the condenser, the coolant passing through the condenser may be supplied to the heater along the opened third line, the coolant passing through the heater may be introduced into the third port along the third line, and then discharged from the first valve back to the sixth line through the second port and introduced back into the condenser, some of the coolant passing through the condenser may be circulated while being introduced back into the battery module along the opened supply line, and in the centralized energy device, each component may operate so that the refrigerant is circulated along the refrigerant line.

When recovering the waste heat of the at least one electrical component and increasing the temperature of the battery module in the heating mode of the vehicle, in the electrical component cooling device and the battery cooling device, the first and second pumps may operate, respectively, the third pump may operate in the indoor heating device, the first line and the fifth line may be connected by operation of the first valve, a portion of the first line connecting the radiator and the second valve may be closed by operation of the second valve, the bypass line may be opened by operation of the second valve, the coolant flowing along the first line may be introduced into the first port, and then discharged to the fifth line through the fifth port and supplied to the chiller, the coolant passing through the chiller may be circulated while being introduced back into the first line connected to the at least one electrical component along the opened bypass line, in the electrical component cooling device, after the coolant passing through the at least one electrical component passes through the chiller along the opened first line, first valve, and fifth line, as the coolant passes through the at least one electrical component without passing through the radiator along the open bypass line, the temperature of the coolant may increase the waste heat of the at least one electrical component, a portion of the second line connecting the battery module and the second valve may be closed by operation of the second valve, the second line may be connected to the sixth line by operation of the first valve, in a state in which the radiator connection line is closed by operation of the third valve, the third line may be opened, the supply line may be connected to the battery module, the coolant passing through the battery module may be introduced into the fourth port along the second line, and then discharged to the sixth line through the second port and supplied to the condenser, the coolant passing through the condenser may be supplied to the heater along the opened third line, the coolant passing through the heater may be introduced into the third port along the third line, and then discharged from the first valve back to the sixth line through the second port and introduced back into the condenser, some of the coolant passing through the condenser may be circulated while being introduced back into the battery module along the opened supply line, and in the centralized energy device, each component may operate so that the refrigerant is circulated along the refrigerant line.

The centralized energy device may include: a first expansion valve which is connected to the condenser through the refrigerant line; an evaporator which is connected to the first expansion valve through the refrigerant line, connected to the fourth line, and lowers the temperature of the coolant while evaporating the refrigerant through heat exchange between the refrigerant and the coolant; a compressor which is provided on the refrigerant line between the evaporator and the condenser; and an accumulator which is provided on the refrigerant line between the evaporator and the compressor, in which a first end portion of the refrigerant connection line may be connected to the refrigerant line between the condenser and the first expansion valve, and a second end portion of the refrigerant connection line may be connected to the refrigerant line between the evaporator and the accumulator.

At a front end portion of the chiller, the refrigerant connection line may be provided with a second expansion valve to control a flow of the refrigerant introduced into the chiller and selectively expand the refrigerant.

The second expansion valve may expand the refrigerant introduced into the refrigerant connection line and introduce the refrigerant into the chiller, when the battery module is cooled using the coolant heat-exchanged with the refrigerant, or when waste heat is selectively recovered from the at least one electrical component and the battery module.

The first expansion valve and the second expansion valve may be an electronic expansion valve that selectively expands the refrigerant while controlling the flow of the refrigerant.

The indoor heating device may further include a coolant heater provided on the third line between the third valve and the third pump.

In the heating mode of the vehicle, the coolant heater may operate when the temperature of the coolant supplied to the heater is lower than a target temperature or when the temperature of the battery module increases.

The first valve may be a five-way valve, the second valve may be a four-way valve, and the third valve may be a three-way valve.

The chiller may recover waste heat generated from the at least one electrical component or the battery module or regulate the temperature of the battery module according to a cooling mode or a heating mode of the vehicle.

When dehumidification is required in a heating mode of the vehicle, the fourth pump provided in the indoor cooling device may operate, and the refrigerant may be supplied to an evaporator provided in the centralized energy device.

As described above, according to the heat pump system for a vehicle according to various exemplary embodiments of the present disclosure, it is possible to simplify a system by use of one chiller in which a coolant and a refrigerant exchange heat with each other in an electric vehicle to regulate a temperature of a battery module according to a mode of the vehicle.

Furthermore, according to various exemplary embodiments of the present disclosure, it is possible to improve heating efficiency by selectively recovering waste heat generated from an external heat source or an electrical component in a heating mode of a vehicle and using the recovered waste heat for indoor heating.

Furthermore, according to various exemplary embodiments of the present disclosure, it is possible to simplify a system and simplify a layout of a connection pipe through which a refrigerant is circulated by selectively exchanging heat between thermal energy generated from the refrigerant and the coolant during condensation and evaporation of the refrigerant, and controlling an indoor temperature of the vehicle using the heat-exchanged low-temperature or high-temperature coolant, respectively.

Furthermore, according to various exemplary embodiments of the present disclosure, it is possible to increase an entire travel distance of a vehicle by efficiently controlling a temperature of a battery module to exhibit optimal performance of the battery module and effectively managing the battery module to increase the entire travel distance of the vehicle.

Furthermore, according to various exemplary embodiments of the present disclosure, it is possible to modularize a centralized energy device that generates thermal energy through condensation and evaporation of a refrigerant, and reduce a size and weight and prevent the occurrence of noise, vibration, and operational instability compared to the conventional air conditioner means by use of a high-performance refrigerant.

Furthermore, according to various exemplary embodiments of the present disclosure, it is possible to reduce cost and a weight by use of a coolant heater applied to an indoor heating device configured for assisting the indoor heating.

Furthermore, according to various exemplary embodiments of the present disclosure, it is possible to reduce manufacturing cost, reduce a weight, and improve space utilization by simplifying an entire system.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
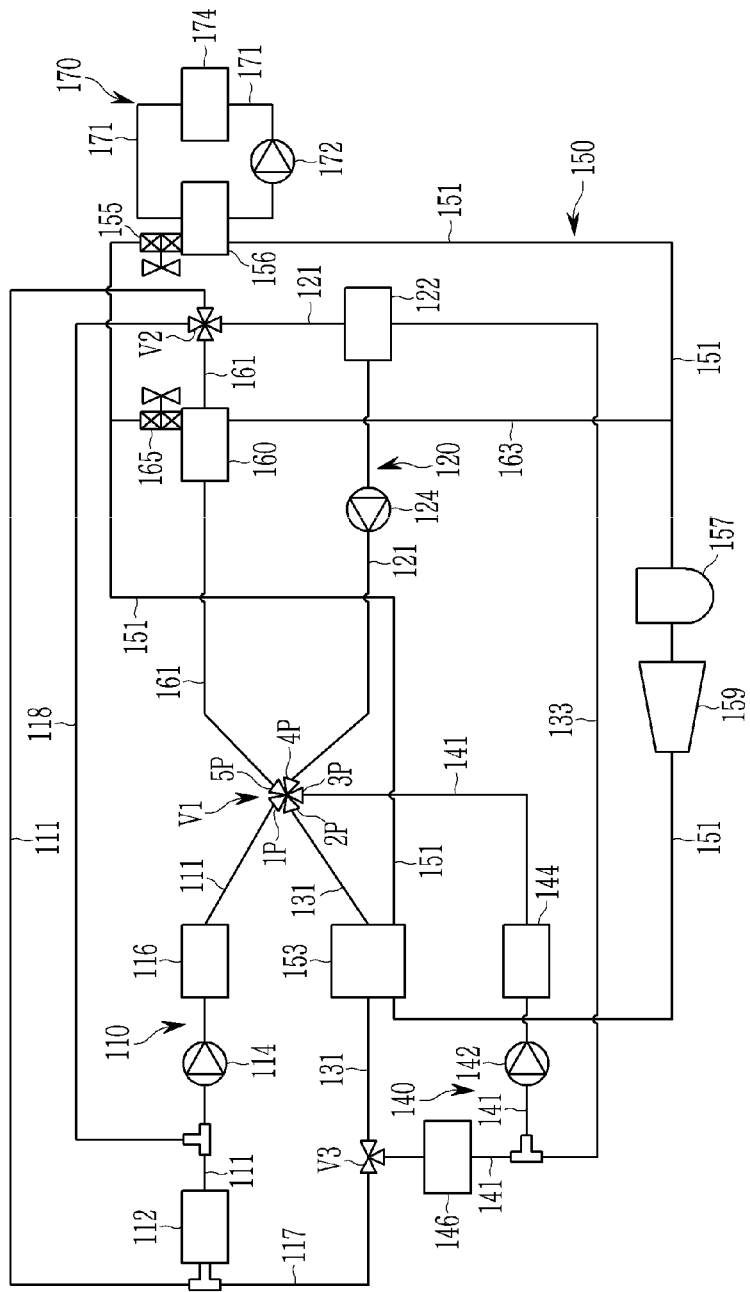
FIG. 1 is a block diagram of a heat pump system for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will hereinafter be described in detail with reference to the accompanying drawings.

Because embodiments stated in the exemplary embodiment and configurations shown in the accompanying drawings are only exemplary embodiments of the present disclosure and do not represent the spirit of the present disclosure. Therefore, it is to be understood that various equivalents and modifications which may replace exemplary embodiments stated in the exemplary embodiment and configurations shown in the accompanying drawings in a point in time at which an exemplary embodiment of the present disclosure is filed.

A description for contents that are not associated with the present disclosure will be omitted to clearly describe the present disclosure, and like reference numerals designate like elements throughout the specification.

Because sizes and thicknesses of the respective components were arbitrarily shown in the accompanying drawings for convenience of explanation, the present disclosure is not limited to contents shown in the accompanying drawings. Furthermore, thicknesses were exaggerated to obviously represent several portions and regions.

Furthermore, throughout the specification, unless explicitly described to the contrary, the word "comprise" and variations such as "comprises" or "comprising", will be understood to imply the inclusion of stated elements but not the exclusion of any other elements.

Furthermore, the terms "— unit", "— means", "— part", "member" described in the specification mean units of a comprehensive configuration for performing at least one function and operation.

FIG. 1 is a block diagram of a heat pump system for a vehicle according to various exemplary embodiments of the present disclosure.

According to various exemplary embodiments of the present disclosure, a heat pump system 100 for a vehicle selectively utilizes a chiller 160 in which a refrigerant and a coolant exchange heat with each other to regulate a temperature of a battery module 122, and selectively utilizes a high-temperature coolant and a low-temperature coolant, respectively, to cool or heat an interior of the vehicle.

Referring to FIG. 1, the heat pump system 100 for a vehicle according to various exemplary embodiments of the present disclosure includes a first valve V1, an electrical component cooling device 110, a battery cooling device 120, an indoor heating device 140, an indoor cooling device 170, a centralized energy device 150 (hereinafter, referred to as a CE device), and the chiller 160.

First, a first valve V1 may control a flow of a coolant introduced thereinto. The first valve V1 may operate according to a control signal from a controller.

In the exemplary embodiment of the present disclosure, the electrical component cooling device 110 includes a first line 111 connected to the first valve V1, a radiator 112 provided on the first line 111, and a first water pump 114.

The radiator 112 is provided at the front of the vehicle, and a cooling fan is provided at the rear of the vehicle to cool a coolant by exchanging heat between the cooling fan and outside air.

The electrical component cooling device 110 may circulate a coolant on the first line 111 by operation of the first water pump 114 to cool the at least one electrical component 116.

Here, the electrical component 116 may include any one of a driving motor, a power control device, an inverter, an on board charger (OBC), a controller, or an autonomous driving controller.

The driving motor, the power control device, the inverter, the controller, and the autonomous driving controller may generate heat while driving, and the charger may generate heat when charging the battery module 122.

The electrical component cooling device 110 configured in the instant way circulates the coolant cooled in the radiator 112 by operation of the first water pump 114 along the first line 111, cooling the electrical component 116 to prevent the electrical component 116 from overheating.

In the exemplary embodiment of the present disclosure, the battery cooling device 120 includes a second line 121 connected to the first valve V1, and the battery module 122 and a second water pump 124 provided on the second line 121.

The battery cooling device 120 configured in the instant way may regulate the temperature of the battery module 122 by circulating the coolant to the battery module 122 by operation of the second water pump 124.

In the exemplary embodiment of the present disclosure, the indoor heating device 140 may include a third water pump 142 and a heater 144 provided on a third line 141 to heat an interior of the vehicle using a high-temperature coolant.

When the indoor heating device 140 configured in the instant way heats the interior of the vehicle, the high-temperature coolant may be circulated on the third line 141 by operation of the third water pump 142 so that the high-temperature coolant is supplied to the heater 144.

Accordingly, the high-temperature coolant may be supplied to the heater 144 along the third line 141.

That is, in a heating mode of the vehicle, the indoor heating device 140 may heat the interior of the vehicle by supplying the high-temperature coolant to the heater 144 by operation of the third water pump 142.

Meanwhile, the heater 144 may be provided inside a heating, ventilation, and air conditioning (HAVC) module.

Here, the third line 141 between a third valve V3 and the third water pump 142 to be described later may be provided with a coolant heater 146 for selectively heating the coolant circulated on the third line 141.

In the heating mode of the vehicle, the coolant heater 146 is turned on when the temperature of the coolant supplied to the heater 144 is lower than a target temperature to heat the coolant circulated on the third line 141, introducing the coolant having an increased temperature into the heater 144.

Furthermore, the coolant heater 146 may selectively operate even when increasing the temperature of the battery module 122.

The coolant heater 146 may be an electric heater that operates according to the supply of power.

Meanwhile, although the exemplary embodiment has been described as an example that the coolant heater 146 is provided on the third line 141, the exemplary embodiment of the present disclosure is not limited thereto, and instead of the coolant heater 146, an air heater may be applied to increase the temperature of the outside air introduced into the interior of the vehicle.

The air heater may be provided at the rear of the heater 144 from the inside of the HVAC module 180 toward the interior of the vehicle to selectively heat the outside air passing through the heater 144.

The indoor heating device 140 configured in the instant way may supply the high-temperature coolant to the heater 144 by operation of the third water pump 142 in the heating mode of the vehicle, heating the interior of the vehicle.

In the exemplary embodiment of the present disclosure, the indoor air conditioner 170 may include a fourth water pump 174 and a cooler 174 interconnected through a fourth line 171 to cool the interior of the vehicle using a low-temperature coolant.

The fourth line 171 may be connected to an evaporator 156 provided in the centralized energy device 150.

The indoor cooling device 170 supplies the coolant whose temperature is lowered while being circulated on the fourth line 171 to the cooler 174 by operation of the fourth water pump 172 in the cooling mode of the vehicle, cooling the interior of the vehicle.

Here, the cooler 174 may be provided inside the HVAC module.

Meanwhile, the HVAC module is provided between the heater 144 and the cooler 174, and includes an opening or closing door for controlling the outside air passing through the cooler 174 to be selectively introduced into the heater 144 according to the cooling, heating, and dehumidifying modes of the vehicle.

That is, in the heating mode of the vehicle, the opening or closing door is opened so that the external air passing through the cooler 174 is introduced into the heater 144. On the other hand, in the cooling mode of the vehicle, the opening or closing door closes the heater 144 side so that the outside air cooled while passing through the cooler 174 is directly introduced into the interior of the vehicle.

In the exemplary embodiment of the present disclosure, the centralized energy device (hereinafter, referred to as a CE device) 150 may be connected to the indoor heating device 140 and connected to the fourth line 171 to supply a high-temperature coolant to the indoor heating device 140, and supply a low-temperature coolant to the indoor cooling device 170.

The CE device 150 may exchange heat between energy generated during condensation and evaporation of a refrigerant circulated on the refrigerant line 151 and each supplied coolant.

The refrigerant may be a high-performance R152-a, or R744, or R290 refrigerant.

That is, the high-temperature coolant is supplied to the heater 144 through the third line 141, and the low-temperature coolant is supplied to the cooler 174 through the fourth line 171.

Here, the CE device 150 includes a condenser 153 connected through the refrigerant line 151, a first expansion valve 155, an evaporator 156, an accumulator 157, and a compressor 159.

First, the condenser 153 circulates a refrigerant therein, and may be provided on a sixth line 131 which is selectively connectable to the first line 111 or the second line 121 by operation of the first valve V1.

That is, the condenser 153 is provided on a sixth line 131 which is selectively connectable to the first line 111 or the second line 121 and has a coolant flowing therethrough.

Accordingly, the condenser 153 may condense the refrigerant by exchanging heat between the refrigerant and the coolant introduced through the sixth line 131.

The first expansion valve 155 may be connected to the condenser 153 through the refrigerant line 151. The first expansion valve 155 receives the refrigerant passing through the condenser 153 and expands the refrigerant.

The evaporator 156 is connected to the first expansion valve 155 through the refrigerant line 151. The evaporator 156 may be connected to the fourth line 171 to cool the coolant circulated on the fourth line 171 in the indoor cooling device 170.

The evaporator 156 configured in the instant way may lower the temperature of the coolant while evaporating a refrigerant by exchanging heat between the refrigerant and the coolant.

Here, the coolant circulated to the indoor cooling device 170 may be supplied to the evaporator 156 along the fourth line 171 so that the evaporator 156 evaporates a refrigerant by exchanging heat with the coolant.

Accordingly, in the cooling mode of the vehicle, the evaporator 156 may cool the coolant circulated on the fourth line 171 by exchanging heat with the low-temperature refrigerant evaporated inside, and may supply the low-temperature coolant to the cooler 174 through the fourth line 171.

Furthermore, the compressor 159 is provided on the refrigerant line 151 between the evaporator 156 and the condenser 153. The compressor 159 may compress a gaseous refrigerant discharged from the evaporator 156, and supply the compressed refrigerant to the condenser 153.

Meanwhile, the accumulator 157 is provided on the refrigerant line 151 between the evaporator 156 and the compressor 159.

The accumulator 157 supplies only the gaseous refrigerant to the compressor 159 to improve efficiency and durability of the compressor 159.

The chiller 160 is connected to the centralized energy device 150 through the refrigerant connection line 163 so that the refrigerant is selectively circulated.

Furthermore, the chiller 160 may be provided in the fifth line 161 connected to the first line and the second line 111 and 121 through the first valve V1 and the second valve V2, respectively.

Accordingly, the chiller 160 may selectively exchange heat between the introduced coolant and the refrigerant to regulate the temperature of the coolant.

Meanwhile, one end portion of the refrigerant connection line 163 may be connected to the refrigerant line 151 connecting the condenser 153 and the first expansion valve 155.

Furthermore, the other end portion of the refrigerant connection line 163 may be connected to the refrigerant line 151 between the evaporator 156 and the accumulator 157.

Here, at the front end portion of the chiller 160, the refrigerant connection line 163 may be provided with a second expansion valve 165 to control the flow of the refrigerant introduced into the chiller 160 and selectively expand the refrigerant.

The second expansion valve 165 may expand the refrigerant introduced into the refrigerant connection line 163 and introduce the refrigerant into the chiller 160, when the battery module 122 is cooled using the coolant heat-exchanged with the refrigerant, or when waste heat is selectively recovered from the at least one electrical component 116.

The second expansion valve 165 expands the condensed refrigerant discharged from the condenser 153 and introduces the expanded refrigerant into the chiller 160 in a state in which the temperature is lowered, further lowering the temperature of the coolant passing through the inside of the chiller 160.

That is, when cooling the battery module 122 using the coolant heat-exchanged with the refrigerant, the chiller 160 lowers the water temperature of the coolant passing through the inside of the chiller 160 using the supplied low-temperature refrigerant.

Accordingly, the coolant whose water temperature is lowered while passing through the chiller 160 is introduced into the battery module 122, and thus, the battery module 122 may be cooled more efficiently.

Meanwhile, when dehumidification is required in the heating mode of the vehicle, the fourth water pump 172 provided in the indoor air conditioner 170 operates, and the refrigerant expanded by operation of the first expansion valve 155 may be supplied to the evaporator 156.

Accordingly, the cooler 174 is supplied with the low-temperature coolant heat-exchanged with the refrigerant in the evaporator 156, so that the indoor dehumidification may be performed.

In the CE device 150 configured in the present way, the condenser 153, the evaporator 156, and the chiller 160 may be a water-cooled heat exchanger into which a coolant is introduced.

Furthermore, the first expansion valve 155 and the second expansion valve 165 may be an electronic expansion valve that selectively expands the refrigerant while controlling the flow of the refrigerant.

Meanwhile, in the exemplary embodiment of the present disclosure, the first valve V1 may include first, second, third, fourth, and fifth ports P1, P2, P3, P4, and P5.

First, one end portion of the first line 111 connected to the electrical component 116 may be connected to the first port P1. Here, the other end portion of the first line 111 may be connected to the second valve V2.

One end portion of the sixth line 131 may be connected to the second port P2 to supply the coolant to the condenser 153.

One end portion of the third line 141 may be connected to the third port P3.

Here, the other end portion of the third line 141 may be selectively connectable to the sixth line 131 through a third valve V3 provided on the sixth line 131.

Accordingly, the coolant may be introduced into the third line 141 by operation of the third valve V3 in the heating mode of the vehicle.

One end portion of the second line 121 may be connected to the fourth port P4. Here, the other end portion of the second line 121 may be connected to the second valve V2.

Furthermore, one end portion of the fifth line 161 may be connected to the fifth port P5.

Meanwhile, the sixth line 131 may be connected to the radiator connection line 117 through the third valve V3 to be selectively connectable to the radiator 112 by operation of the third valve V3.

That is, one end portion of the radiator connection line 117 may be connected to the third valve V3. Furthermore, the other end portion of the radiator connection line 117 may be connected to the radiator 112.

In the exemplary embodiment of the present disclosure, the heat pump system 100 may further include a bypass line 118 and a supply line 133.

First, the bypass line 118 may circulate the coolant passing through the electrical component 116 back to the electrical component 116 without passing through the radiator 112.

One end portion of the bypass line 118 may be connected to the second valve V2. The other end portion of the bypass line 118 may be connected to the first line 111 between the radiator 112 and the first water pump 114.

The bypass line 118 configured in the instant way may be selectively opened by operation of the second valve V2 when the temperature of the coolant increases by absorbing the waste heat generated by the electrical component 116.

In the exemplary embodiment of the present disclosure, one end portion of the supply line 133 is connected to the third line 141. The other end portion of the supply line 133 may be connected to the battery module 122.

The supply line 133 may supply some of the coolant supplied to the third line 141 to the battery module 122.

Here, the first valve V1 may be a five-way valve, the second valve V2 may be a four-way valve, and the third valve V3 may be a three-way valve.

Hereinafter, operations and actions of a heat pump system for a vehicle according to various exemplary embodiments of the present disclosure configured as described above will be described in detail with reference to FIG. 2, FIG. 3 and FIG. 4.

First, an operation when the battery module is cooled according to a cooling mode of a vehicle in the heat pump system for a vehicle according to the exemplary embodiment of the present disclosure will be described with reference to FIG. 2.

Figure 2:
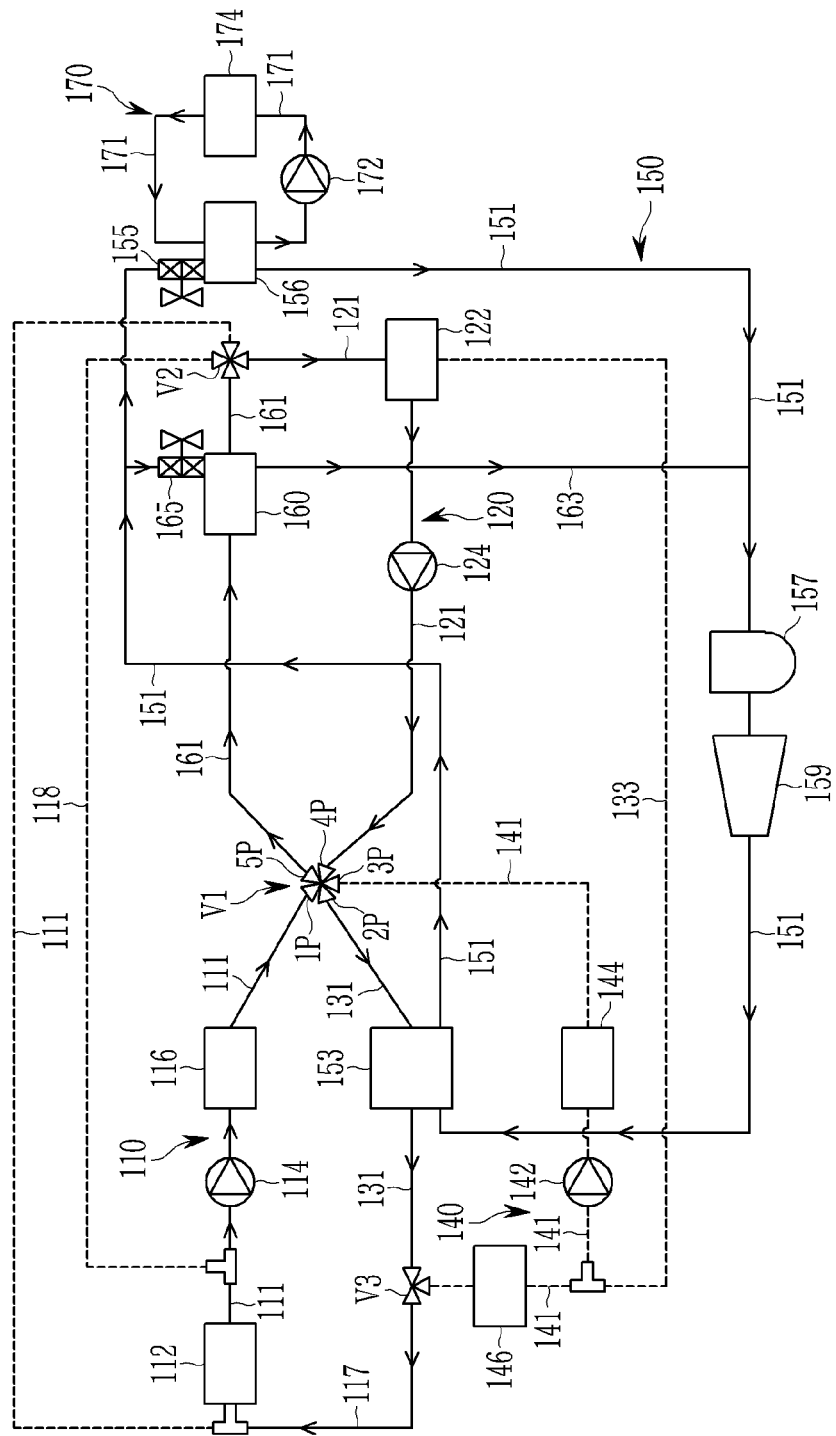
FIG. 2 is an operation state diagram when a battery module is cooled according to a cooling mode in the heat pump system for a vehicle according to the exemplary embodiment of the present disclosure.

FIG. 2 is an operation state diagram when a battery module is cooled according to a cooling mode in the heat pump system for a vehicle according to the exemplary embodiment of the present disclosure.

Referring to FIG. 2, when the battery module 122 is cooled in the cooling mode of the vehicle, in the electrical component cooling device 110, the coolant is circulated to the first line 111 by operation of the first water pump 114.

Here, the first line 111 is connected to the sixth line 131 by operation of the first valve V1.

A portion of the first line 111 and the bypass line 118 connecting the radiator 112 and the second valve V2 may be closed by operation of the second valve V2.

Furthermore, the sixth line 131 may be connected to the radiator connection line 117 by operation of the third valve V3.

The third line 141 and the supply line 133 may be closed by operation of the third valve V3. That is, the indoor heating device 140 is not operated.

Accordingly, the coolant flowing along the first line 111 is introduced into the first port P1, and then is discharged to the sixth line 131 through the second port P2 and supplied to the condenser 153.

The coolant passing through the condenser 153 is introduced into the radiator 112 through the radiator connection line 118.

That is, in the electrical component cooling device 110, the coolant may be circulated to the radiator 112, the electrical component 116, and the capacitor 153 along the opened first line 111, first valve V1, sixth line 131, and radiator connection line 117.

Accordingly, the coolant cooled by the radiator 112 may cool the electrical component 116 and exchange heat with the refrigerant supplied to the condenser 153.

In the battery cooling device 120, the coolant is circulated to the second line 121 by operation of the second water pump 124.

Here, the second line 121 and the fifth line 161 may be opened by operation of the first valve V1.

Also, the second line 121 and the fifth line 161 may be connected by operation of the second valve V2.

Accordingly, the coolant flowing along the second line 121 is introduced into the fourth port P4 provided in the first valve V1. Accordingly, the coolant may be discharged from the first valve V1 to the fifth line 161 through the fifth port P5 and supplied to the chiller 160.

The coolant passing through the chiller 160 is introduced into the battery module 122 along the second line 121 connected through the second valve V2.

That is, the coolant circulated in the battery cooling device 120 may be circulated along the second line 121, the first valve V1, and the fifth line 161.

Meanwhile, in the CE device 150, each component may operate so that the refrigerant is circulated along the refrigerant line 151 to heat the interior of the vehicle.

In the instant case, the first and second expansion valves 155 and 165 may expand the refrigerant passing through the condenser 153 and supply the expanded refrigerant to the evaporator 156 and the chiller 160, respectively.

Accordingly, the coolant supplied through the fifth line 161 is cooled through heat exchange with the low-temperature refrigerant supplied to the chiller 160.

The cooled coolant may efficiently cool the battery module 122 while being circulated along the second line 121 connected to the fifth line 161.

Meanwhile, in the indoor cooling device 170, the fourth water pump 172 may operate so that the coolant is circulated along the fourth line 171 connecting the evaporator 156 and the cooler 174 to supply the coolant passing through the evaporator 156 to the cooler 174.

Here, the outdoor air introduced into the HVAC module is cooled while passing through the cooler 174 by the low-temperature coolant introduced into the cooler 174.

In the instant case, opening/closing door closes a portion passing through the heater 144 so that the cooled outside air does not pass through the heater 144. Accordingly, the cooled outside air may be directly introduced into the interior of the vehicle.

Accordingly, the indoor cooling device 170 supplies the coolant whose temperature is lowered while being circulated on the fourth line 171 to the cooler 174 by operation of the fourth water pump 172 in the cooling mode of the vehicle, cooling the interior of the vehicle.

In the exemplary embodiment of the present disclosure, an operation of recovering the external heat source during the heating mode of the vehicle and increasing the temperature of the battery module 122 will be described with reference to FIG. 3.

Figure 3:
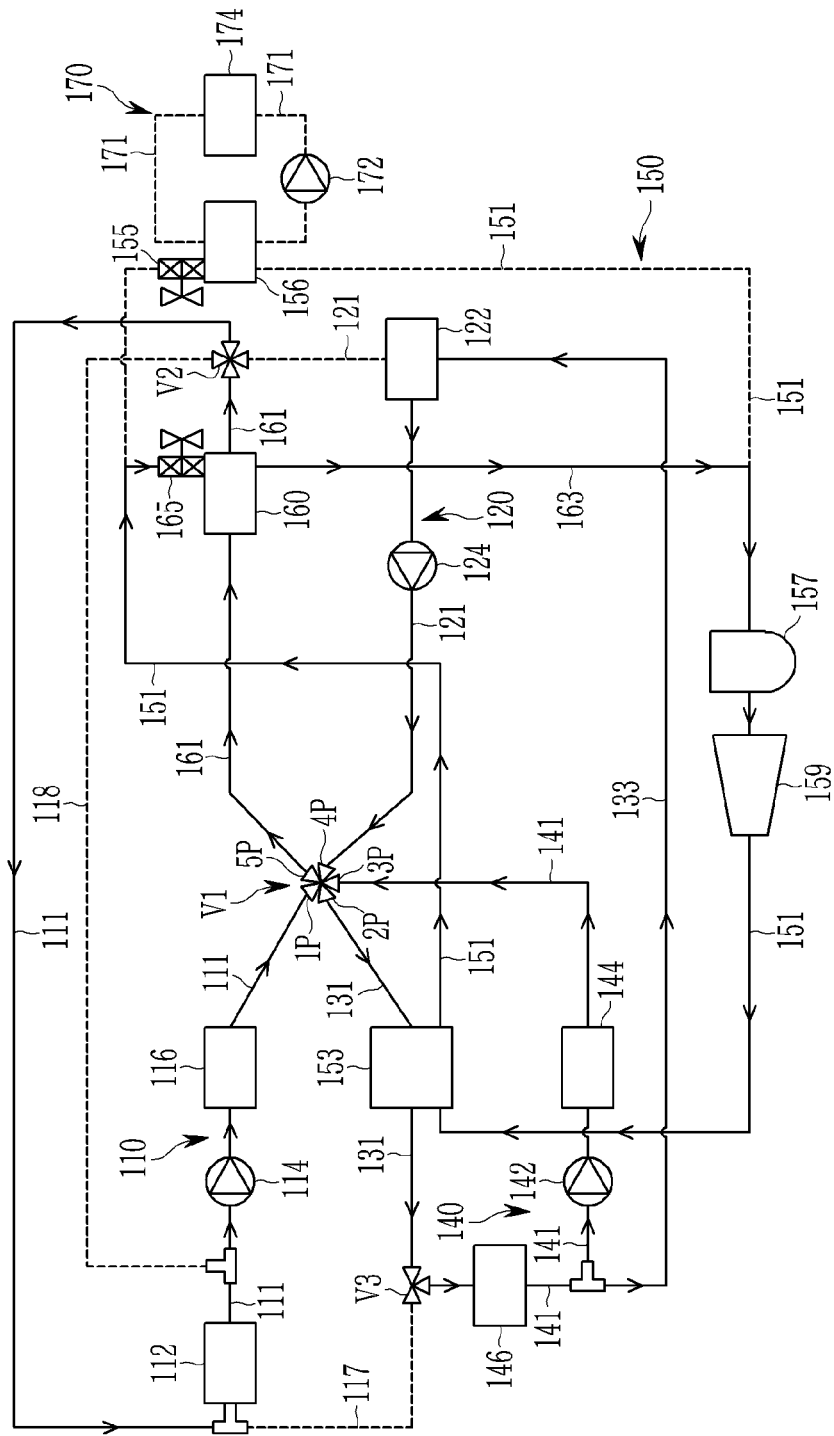
FIG. 3 is an operation state diagram for recovery of an external heat source and a temperature increase of the battery module according to a heating mode in the heat pump system for a vehicle according to the exemplary embodiment of the present disclosure.

FIG. 3 is an operation state diagram for recovery of an external heat source and a temperature increase of the battery module according to a heating mode in the heat pump system for a vehicle according to the exemplary embodiment of the present disclosure.

Referring to FIG. 3, the heat pump system 100 may recover the external heat source in the heating mode of the vehicle, use the external heat source for indoor heating, and increase the temperature of the battery module 122.

In the exemplary embodiment of the present disclosure, the first and second water pumps 114 and 124 operate in the electrical component cooling device 110 and the battery cooling device 120, respectively.

Furthermore, the third water pump 142 operates in the indoor heating device 140.

First, the first line 111 and the fifth line 161 are always connected by operation of the first valve V1.

A portion of the first line 111 connecting the radiator 112 and the second valve V2 is opened by operation of the second valve V2. Also, the bypass line 118 is closed by operation of the second valve V2.

Accordingly, the coolant flowing along the first line 111 is introduced into the first port P1 provided in the first valve V1, and then discharged from the first valve V1 to the fifth line 161 through the port P5.

The coolant discharged to the fifth line 161 is supplied to the chiller 160 along the fifth line 161. Accordingly, the coolant passing through the chiller 160 may be introduced from the second valve V2 into the radiator 112 through the first line 111.

That is, the coolant passing through the electrical component 116 in the electrical component cooling device 110 passes through the chiller 160 along the first line 111, the first valve V1, and the fifth line 161. Accordingly, the coolant may recover the heat source from the outside thereof air while passing through the radiator 112 along the first line 111 opened through the second valve V2.

Meanwhile, a portion of the second line 121 connecting the battery module 122 and the second valve V2 is closed by operation of the second valve V2.

The remaining second line 121 is connected to the sixth line 131 by operation of the first valve V1.

In the exemplary embodiment of the present disclosure, the radiator connection line 117 may be closed by operation of the third valve V3, and at the same time, the third line 141 may be opened.

Furthermore, the supply line 133 may be opened to be connected to the battery module 122.

Accordingly, the coolant passing through the battery module 122 is discharged to the sixth line 161 along the opened second line 121 through the second port P2 provided in the first valve V1.

The coolant discharged to the sixth line 161 may be supplied to the condenser 153 along the sixth line 131. The coolant passing through the condenser 153 is supplied to the heater 144 along the opened third line 141.

Here, the coolant heater 146 operates when the temperature of the coolant circulated along the third line 141 is lower than a target temperature to heat the coolant circulated on the third line 141.

Meanwhile, the opening/closing door is opened so that the outside air introduced into the HVAC module and passing through the cooler 174 passes through the heater 144.

Accordingly, when the outside air introduced from the outside thereof passes through the cooler 174 to which the low-temperature coolant is not supplied, the outside air is introduced in a room temperature state in which the outside air is not cooled. The introduced external air is changed to a high temperature state while passing through the heater 144 and is then introduced into the interior of the vehicle so that heating of the interior of the vehicle may be implemented.

That is, the heat pump system 100 according to the exemplary embodiment of the present disclosure absorbs an external heat source from the radiator 112 and utilizes the heat source for indoor heating of the vehicle, reducing power consumption of the compressor 59 and improving heating efficiency.

Meanwhile, the coolant passing through the heater 144 is introduced into the third port P3 along the third line 141. Accordingly, the coolant introduced into the third port P3 may be discharged from the first valve V1 back to the sixth line 131 through the second port P2, and again may be introduced into the condenser 153 again.

Some of the coolant passing through the condenser 153 may be circulated while being introduced into the battery module 122 along the opened supply line 133.

Accordingly, the coolant whose temperature increases while passing through the heater 144 and the capacitor 153 is introduced into the battery module 122, increasing the temperature of the battery module 122.

Meanwhile, in the CE device 150, each component may operate so that the refrigerant is circulated along the refrigerant line 151 to heat the interior of the vehicle.

In the instant case, the first expansion valve 155 is not operated, and the second expansion valve 165 expands the refrigerant passing through the condenser 153 and supplies the expanded refrigerant to the chiller 160. Accordingly, the supply of the refrigerant to the evaporator 156 is stopped.

Here, when the dehumidification of the interior of the vehicle is required while the vehicle is in the heating mode, the first expansion valve 155 operates to supply the expanded refrigerant to the evaporator 156.

At the same time, in the indoor air conditioner 170, the fourth water pump 172 operates, and the coolant is circulated along the fourth line 171.

The coolant circulated along the fourth line 171 may be introduced into the cooler 174 while being cooled through heat exchange with the refrigerant in the evaporator 156.

That is, the outside air introduced into the HVAC module is dehumidified while passing through the cooler 174 by the low-temperature coolant introduced into the cooler 174. Thereafter, the outside air is changed to the high temperature state while passing through the heater 144 and introduced into the interior of the vehicle, heating and dehumidifying the interior of the vehicle.

In the exemplary embodiment of the present disclosure, an operation of recovering the waste heat of the electrical component 116 in the heating mode of the vehicle and increasing the temperature of the battery module 122 will be described with reference to FIG. 4.

Figure 4:
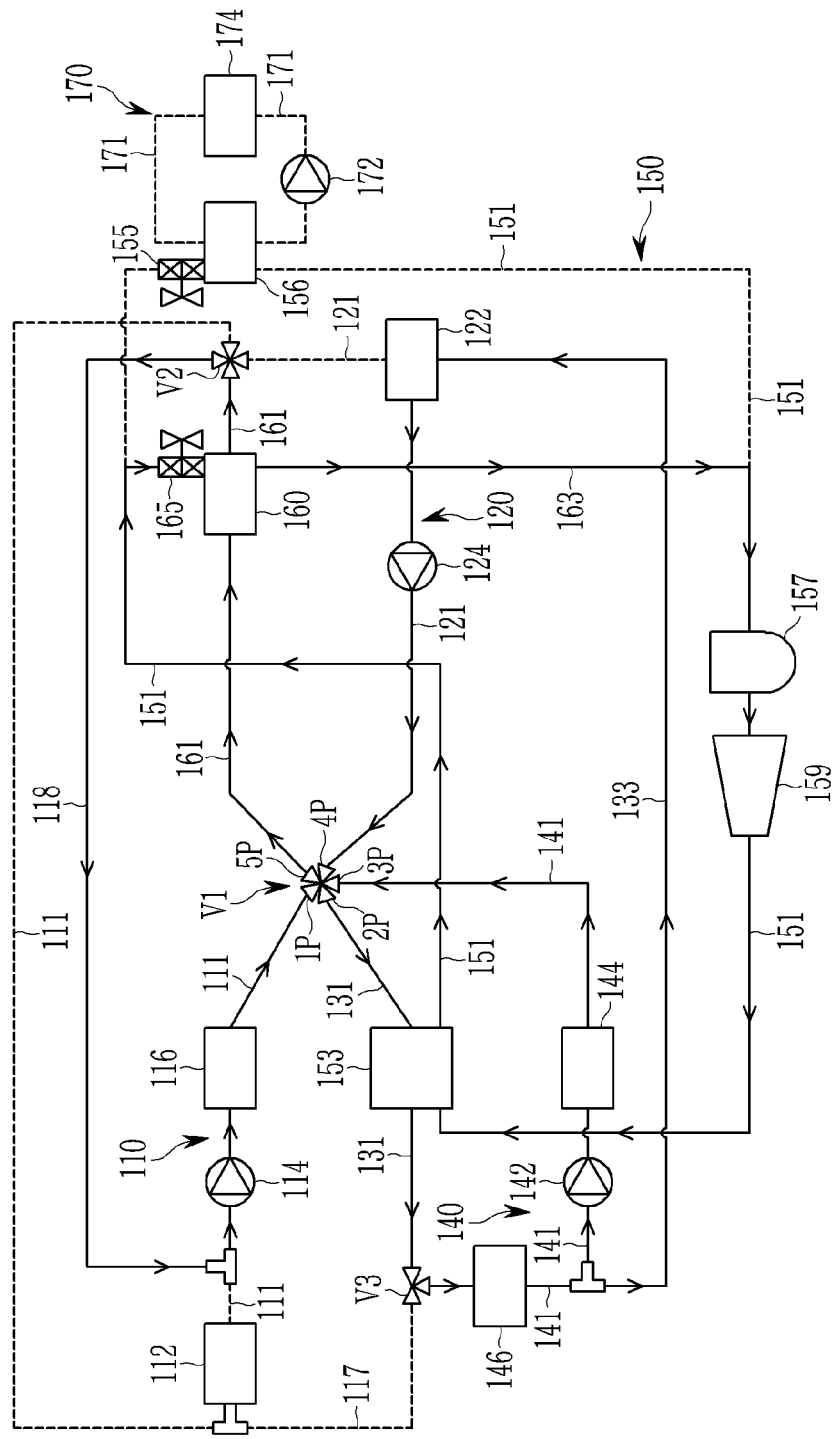
FIG. 4 is an operation state diagram for the recovery of waste heat of an electrical component and the temperature increase of the battery module according to the heating mode in the heat pump system for a vehicle according to the exemplary embodiment of the present disclosure.

FIG. 4 is an operation state diagram for the recovery of waste heat of an electrical component and the temperature increase of the battery module according to the heating mode in the heat pump system for a vehicle according to the exemplary embodiment of the present disclosure.

Referring to FIG. 4, the heat pump system 100 may recover the waste heat of the electrical component in the heating mode of the vehicle, recover the waste heat of the electrical component 116 for indoor heating, and increase the temperature of the battery module 122.

In the exemplary embodiment of the present disclosure, the first and second water pumps 114 and 124 operate in the electrical component cooling device 110 and the battery cooling device 120, respectively.

Furthermore, the third water pump 142 operates in the indoor heating device 140.

First, the first line 111 and the fifth line 161 are connected by operation of the first valve V1.

A portion of the first line 111 connecting the radiator 112 and the second valve V2 is closed by operation of the second valve V2. At the same time, the bypass line 118 is opened by operation of the second valve V2.

The opened bypass line 118 may be connected to the first line 111 between the radiator 112 and the first water pump 114.

Accordingly, the coolant flowing along the first line 111 is introduced into the first port P1 provided in the first valve V1. Accordingly, the coolant is discharged from the first valve V1 to the fifth line 161 through the fifth port P5 and supplied to the chiller 160.

The coolant passing through the chiller 160 is circulated while being introduced into the first line 111 connected to the electrical component 116 again along the opened bypass line 118.

That is, the coolant passing through the electrical component 116 may pass through the chiller 160 along the opened first line 111, first valve V1, and fifth line 161.

Accordingly, the temperature of the coolant passing through the chiller 160 may increase by the waste heat of the electrical component 116 while the coolant passes through the electrical component 116 again without passing through the radiator 112 along the opened bypass line 118 of the electrical component 116.

That is, in the electrical component cooling device 110, the temperature of the coolant increases by recovering the waste heat generated from the electrical component 116 while the coolant is circulated on the opened first line 111, the opened fifth line 161, and the bypass line 118.

The coolant having the increased temperature may be supplied to the chiller 160 connected to the fifth line 161. Accordingly, the waste heat generated from the electrical component 116 increases the temperature of the refrigerant supplied to the chiller 160.

That is, while repeatedly performing these operations, the coolant may absorb the waste heat from the electrical component 116, so that the temperature of the coolant may increase.

As the coolant whose temperature increases by absorbing the waste heat of the electrical component 116 passes through the chiller 160 through operation of the first water pump 114, the refrigerant supplied to the chiller 160 is recovered while the temperature of the refrigerant increases.

Accordingly, the chiller 160 may exchange heat between the coolant and the refrigerant to recover the waste heat from the coolant whose temperature increases while passing through the electrical component 116, increasing the temperature of the refrigerant.

That is, the chiller 160 may be supplied with the refrigerant expanded through operation of the second expansion valve 165 through the refrigerant connection line 163, and evaporate the supplied refrigerant by the heat exchange with the coolant whose temperature increases while the refrigerant passes through the electrical component 116, recovering the waste heat of the electrical component 116.

Meanwhile, a portion of the second line 121 connecting the battery module 122 and the second valve V2 is closed by operation of the second valve V2.

The remaining second line 121 is connected to the sixth line 131 by operation of the first valve V1.

In the exemplary embodiment of the present disclosure, the radiator connection line 117 may be closed by operation of the third valve V3, and at the same time, the third line 141 may be opened.

Furthermore, the supply line 133 may be opened to be connected to the battery module 122.

Accordingly, the coolant passing through the battery module 122 is discharged to the sixth line 161 along the opened second line 121 through the second port P2 provided in the first valve V1.

The coolant discharged to the sixth line 161 may be supplied to the condenser 153 along the sixth line 131. The coolant passing through the condenser 153 is supplied to the heater 144 along the opened third line 141.

Here, the coolant heater 146 operates when the temperature of the coolant circulated along the third line 141 is lower than a target temperature to heat the coolant circulated on the third line 141.

Meanwhile, the opening/closing door is opened so that the outside air introduced into the HVAC module and passing through the cooler 174 passes through the heater 144.

Accordingly, when the outside air introduced from the outside thereof passes through the cooler 174 to which the low-temperature coolant is not supplied, the outside air is introduced in a room temperature state in which the outside air is not cooled. The introduced external air is changed in a high temperature state while passing through the heater 144 and is then introduced into the interior of the vehicle so that heating of the interior of the vehicle may be implemented.

That is, the heat pump system 100 according to the exemplary embodiment of the present disclosure may recover the waste heat generated from the electrical component 116 and use the waste heat for indoor heating of the vehicle, reducing power consumption of the compressor 59 and improving heating efficiency.

Meanwhile, the coolant passing through the heater 144 is introduced into the third port P3 along the third line 141.

Accordingly, the coolant introduced into the third port P3 may be discharged from the first valve V1 back to the sixth line 131 through the second port P2 again, and may be introduced into the condenser 153 again.

Some of the coolant that has passed through the condenser 153 may be circulated while being introduced into the battery module 122 along the opened supply line 133.

Accordingly, the coolant whose temperature increases while passing through the heater 144 and the capacitor 153 is introduced into the battery module 122, increasing the temperature of the battery module 122.

Meanwhile, in the CE device 150, each component may operate so that the refrigerant is circulated along the refrigerant line 151 to heat the interior of the vehicle.

In the instant case, the first expansion valve 155 is not operated, and the second expansion valve 165 expands the refrigerant that has passed through the condenser 153 and supplies the expanded refrigerant to the chiller 160. Accordingly, the supply of the refrigerant to the evaporator 156 is stopped.

Here, when the dehumidification of the interior of the vehicle is required while the vehicle is in the heating mode, the first expansion valve 155 operates to supply the expanded refrigerant to the evaporator 156.

At the same time, in the indoor air conditioner 170, the fourth water pump 172 operates, and the coolant is circulated along the fourth line 171.

The coolant circulated along the fourth line 171 may be introduced into the cooler 174 while being cooled through heat exchange with the refrigerant in the evaporator 156.

That is, the outside air introduced into the HVAC module is dehumidified while passing through the cooler 174 by the low-temperature coolant introduced into the cooler 174.

Thereafter, the outside air is changed to the high temperature state while passing through the heater 144 and introduced into the interior of the vehicle, heating and dehumidifying the interior of the vehicle.

Accordingly, as described above, according to the heat pump system 100 for a vehicle according to various exemplary embodiments of the present disclosure, it is possible to simplify a system by use of the chiller 160 in which a coolant and a refrigerant exchange heat with each other in an electric vehicle to regulate the temperature of the battery module 122 according to the mode of the vehicle.

Furthermore, according to an exemplary embodiment of the present disclosure, it is possible to improve heating efficiency by selectively recovering the waste heat generated from the external heat source or the electrical component 116 in the heating mode of the vehicle and using the recovered waste heat for indoor heating.

Furthermore, according to an exemplary embodiment of the present disclosure, it is possible to simplify the system and simplify the layout of the connection pipe through which the refrigerant is circulated by selectively exchanging heat between thermal energy generated from the refrigerant and the coolant during the condensation and evaporation of the refrigerant, and controlling the indoor temperature of the vehicle using the heat-exchanged low-temperature or high-temperature coolant, respectively.

Furthermore, according to an exemplary embodiment of the present disclosure, it is possible to increase an entire travel distance of a vehicle by efficiently controlling the temperature of the battery module 122 to exhibit optimal performance of the battery module 122 and effectively managing the battery module 122 to increase the entire travel distance of the vehicle.

Furthermore, according to an exemplary embodiment of the present disclosure, it is possible to modularize the centralized energy device 150 that generates thermal energy through the condensation and evaporation of the refrigerant, and reduce the size and weight and prevent the occurrence of noise, vibration, and operational instability compared to the conventional air conditioner means by use of a high-performance refrigerant.

Furthermore, according to an exemplary embodiment of the present disclosure, it is possible to reduce the cost and weight by use of the coolant heater applied to the indoor heating device for assisting the indoor heating.

Furthermore, according to an exemplary embodiment of the present disclosure, it is possible to reduce the manufacturing cost, reduce the weight, and improve the space utilization by simplifying the entire system.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A heat pump system for a vehicle, the heat pump system comprising:
    a first valve that is configured to control a flow of a coolant introduced thereinto;
    an electrical component cooling device that includes a first line connected to the first valve, and a radiator and a first pump provided on the first line, and is configured to circulate the coolant on the first line to cool at least one electrical component provided on the first line;
    a battery cooling device that includes a second line connected to the first valve, and a second pump and a battery module provided on the second line, and is configured to circulate a coolant to the battery module;
    an indoor heating device that includes a third line connected to the first valve to heat an interior of the vehicle using a high-temperature coolant, and a third pump and a heater interconnected through the third line;
    an indoor cooling device that includes a fourth pump and a cooler interconnected through a fourth line to cool the interior of the vehicle using a low-temperature coolant;
    a centralized energy (CE) device that regulates a temperature of the coolant by exchanging heat between thermal energy generated during condensation and evaporation of a refrigerant circulated on a refrigerant line and the introduced coolant to supply the high-temperature coolant to the indoor heating device and supply the low-temperature coolant to the indoor cooling device; and
    a chiller which is connected to the centralized energy device through a refrigerant connection line so that the refrigerant is selectively circulated, and is provided on a fifth line connected to the first line and the second line through the first valve or a second valve, and selectively heat-exchanges the introduced coolant with the refrigerant to regulate the temperature of the coolant,
    wherein the first valve includes at least one port through which the coolant is introduced or discharged.

2. The heat pump system of claim 1, wherein the at least one port includes:
    a first port to which a first end portion of the first line connected to the at least one electrical component is connected;
    a second port to which a first end portion of a sixth line is connected to supply a coolant to a condenser provided in the centralized energy device;
    a third port to which a first end portion of the third line is connected;
    a fourth port to which a first end portion of the second line is connected; and a fifth port to which a first end portion of the fifth line is connected.

3. The heat pump system of claim 2,
wherein a second end portion of the first line is connected to the second valve,
wherein a second end portion of the second line is connected to the second valve,
wherein a second end portion of the third line is selectively connectable through a third valve provided on the sixth line, and
wherein the sixth line is connected to a radiator connection line through the third valve to be selectively connectable to the radiator by operation of the third valve.

4. The heat pump system of claim 3,
wherein a first end portion of the radiator connection line is connected to the third valve, and
wherein a second end portion of the radiator connection line is connected to the radiator.

5. The heat pump system of claim 3, further including:
a supply line that has a first end portion connected to the third line and a second end portion connected to the battery module; and
a bypass line that has a first end portion connected to the second valve and a second end portion connected to the first line between the radiator and the first pump so that the coolant is circulated to the at least one electrical component by bypassing the radiator.

6. The heat pump system of claim 5, wherein
when cooling the battery mode in a cooling mode of the vehicle,
in the electrical component cooling device, the coolant is circulated on the first line by operation of the first pump,
the first line and the sixth line are connected by operation of the first valve,
a portion of the first line connecting the radiator and the second valve and the bypass line are closed by operation of the second valve,
the sixth line and the radiator connection line are connected by operation of the third valve,
the third line and the supply line are closed by operation of the third valve,
the coolant flowing along the first line is introduced into the first port, and then is discharged to the sixth line through the second port and supplied to the condenser,
the coolant passing through the condenser is introduced into the radiator through the opened radiator connection line,
in the electrical component cooling device, the coolant is circulated to the radiator, the at least one electrical component, and the condenser along the opened first line, first valve, sixth line, and radiator connection line,
in the battery cooling device, the second pump operates,
the second line and the fifth line are opened by operation of the first valve,
the second line and the fifth line are connected by operation of the second valve,
the coolant flowing along the second line is introduced into the fourth port, and then is discharged to the fifth line through the fifth port and supplied to the chiller,
the coolant passing through the chiller is introduced into the battery module along the second line connected through the second line,
in the battery cooling device, the coolant is circulated to the battery module and the chiller along the second line, the first valve, and the fifth line,
in the centralized energy device, each component operates to circulate the refrigerant along the refrigerant line, and
in the indoor cooling device, the fourth pump operates so that the coolant is circulated along the fourth line connecting a evaporator and the cooler to supply the coolant passing through the evaporator provided in the centralized energy device to the cooler.

7. The heat pump system of claim 5, wherein
when recovering an external heat source and increasing a temperature of the battery module in a heating mode of the vehicle,
in the electrical component cooling device and the battery cooling device, the first and second pumps operate, respectively,
the third pump operates in the indoor heating device,
the first line and the fifth line are connected by operation of the first valve,
a portion of the first line connecting the radiator and the second valve is opened by operation of the second valve,
the bypass line is closed by operation of the second valve,
the coolant flowing along the first line is introduced into the first port, and then is discharged to the fifth line through the fifth port and supplied to the chiller,
the coolant passing through the chiller is introduced into the radiator along the opened first line,
in the electrical component cooling device, the coolant passing through the at least one electrical component passes through the chiller along the first line, the first valve, and the fifth line, and then recovers a heat source from an outside air while passing through the radiator along the opened first line,
a portion of the second line connecting the battery module and the second valve is closed by operation of the second valve,
the second line is connected to the sixth line by operation of the first valve,
in a state in which the radiator connection line is closed by operation of the third valve, the third line is opened,
the supply line is connected to the battery module,
the coolant passing through the battery module is introduced into the fourth port along the second line, and then discharged to the sixth line through the second port and supplied to the condenser,
the coolant passing through the condenser is supplied to the heater along the opened third line,
the coolant passing through the heater is introduced into the third port along the third line, and then discharged from the first valve back to the sixth line through the second port and introduced back into the condenser,
some of the coolant passing through the condenser is circulated while being introduced back into the battery module along the opened supply line, and
in the centralized energy device, each component operates so that the refrigerant is circulated along the refrigerant line.

8. The heat pump system of claim 5, wherein
when recovering a waste heat of the at least one electrical component and increasing a temperature of the battery module in a heating mode of the vehicle,
in the electrical component cooling device and the battery cooling device, the first and second pumps operate, respectively,
the third pump operates in the indoor heating device,
the first line and the fifth line are connected by operation of the first valve, a portion of the first line connecting the radiator and the second valve is closed by operation of the second valve, the bypass line is opened by operation of the second valve, the coolant flowing along the first line is introduced into the first port, and then is discharged to the fifth line through the fifth port and supplied to the chiller, the coolant passing through the chiller is circulated while being introduced back into the first line connected to the at least one electrical component along the opened bypass line, in the electrical component cooling device, after the coolant passing through the at least one electrical component passes through the chiller along the opened first line, first valve, and fifth line, as the coolant passes through the at least one electrical component without passing through the radiator along the open bypass line, the temperature of the coolant increases by the waste heat of the at least one electrical component, a portion of the second line connecting the battery module and the second valve is closed by operation of the second valve, the second line is connected to the sixth line by operation of the first valve, in a state in which the radiator connection line is closed by operation of the third valve, the third line is opened, the supply line is connected to the battery module, the coolant passing through the battery module is introduced into the fourth port along the second line, and then discharged to the sixth line through the second port and supplied to the condenser, the coolant passing through the condenser is supplied to the heater along the opened third line, the coolant passing through the heater is introduced into the third port along the third line, and then discharged from the first valve back to the sixth line through the second port and introduced back into the condenser, some of the coolant passing through the condenser is circulated while being introduced back into the battery module along the opened supply line, and in the centralized energy device, each component operates so that the refrigerant is circulated along the refrigerant line.

9. The heat pump system of claim 3, wherein the indoor heating device further includes a coolant heater provided on the third line between the third valve and the third pump.

10. The heat pump system of claim 9, further including:
a supply line that has a first end portion connected to the third line between the coolant heater and the third pump and a second end portion connected to the battery module.

11. The heat pump system of claim 9, wherein in a heating mode of the vehicle, the coolant heater operates when the temperature of the coolant supplied to the heater is lower than a target temperature or when a temperature of the battery module increases.

12. The heat pump system of claim 9, wherein the indoor heating device further includes an air heater provided at a rear of the heater to selectively heat the outside air passing through the heater.

13. The heat pump system of claim 3, wherein the first valve is a five-way valve, the second valve is a four-way valve, and the third valve is a three-way valve.

14. The heat pump system of claim 2, wherein the centralized energy device includes:
a first expansion valve which is connected to the condenser through the refrigerant line;
an evaporator which is connected to the first expansion valve through the refrigerant line, connected to the fourth line, and lowers the temperature of the coolant while evaporating the refrigerant through heat exchange between the refrigerant and the coolant;
a compressor which is provided on the refrigerant line between the evaporator and the condenser; and
an accumulator which is provided on the refrigerant line between the evaporator and the compressor,
wherein a first end portion of the refrigerant connection line is connected to the refrigerant line between the condenser and the first expansion valve, and
a second end portion of the refrigerant connection line is connected to the refrigerant line between the evaporator and the accumulator.

15. The heat pump system of claim 14, wherein at a front end portion of the chiller, the refrigerant connection line is provided with a second expansion valve to control a flow of the refrigerant introduced into the chiller and selectively expand the refrigerant.

16. The heat pump system of claim 15, wherein the second expansion valve expands the refrigerant introduced into the refrigerant connection line and introduces the refrigerant into the chiller, when the battery module is cooled using the coolant heat-exchanged with the refrigerant, or when waste heat is selectively recovered from the at least one electrical component and the battery module.

17. The heat pump system of claim 15, wherein the first expansion valve and the second expansion valve are an electronic expansion valve that selectively expands the refrigerant while controlling the flow of the refrigerant.

18. The heat pump system of claim 1, wherein the chiller recovers waste heat generated from the at least one electrical component or the battery module or regulates a temperature of the battery module according to a cooling mode or a heating mode of the vehicle.

19. The heat pump system of claim 1, wherein when dehumidification is required in a heating mode of the vehicle, the fourth pump provided in the indoor cooling device operates, and the refrigerant is supplied to an evaporator provided in the centralized energy device.

* * * * *